April 9, 1929.  V. E. NELSON  1,708,484
GREASE RETAINER
Filed July 27, 1925
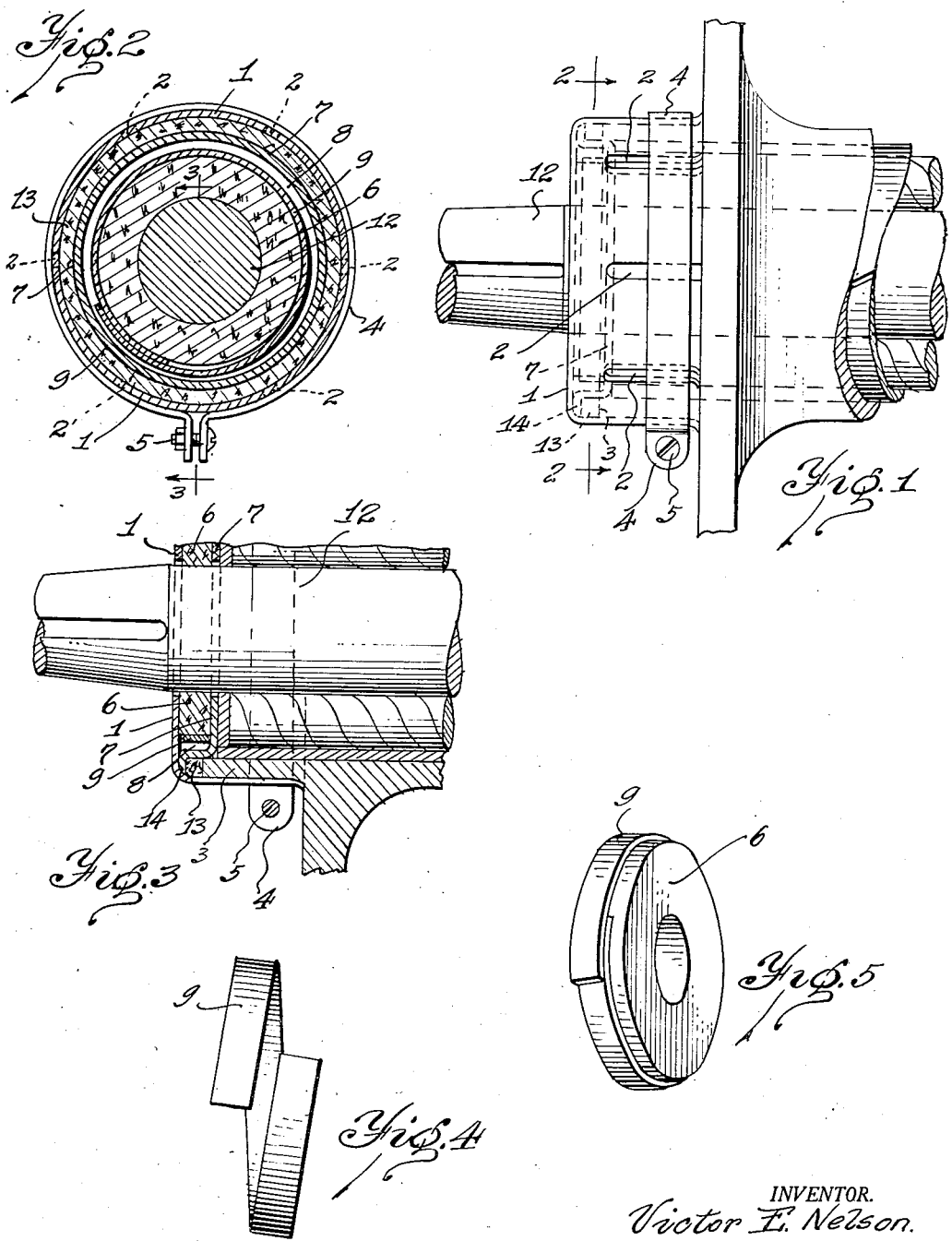
INVENTOR.
Victor E. Nelson.
BY
ATTORNEY.

Patented Apr. 9, 1929.

1,708,484

UNITED STATES PATENT OFFICE.

VICTOR E. NELSON, OF DETROIT, MICHIGAN.

GREASE RETAINER.

Application filed July 27, 1925. Serial No. 46,330.

This invention relates to grease retainers and the object of the invention is to provide a grease retainer adapted to prevent oil or grease leakage along a shaft.

Another object of the invention is to provide a packing which is contractable about a shaft and in which the shaft is adapted to rotate.

This packing is particularly adapted for use between the rear axle housing and the rear wheel of an automobile to prevent oil or grease from leaking from the differential through the housing and bearing therein and to prevent leakage of oil or grease from the bearing itself.

This packing is also adapted to prevent leakage about the drive shaft of an automobile where it extends through the transmission housing and may be used in a great many other places to prevent leakage along a shaft.

The principal object of the invention is to provide a packing which at all times is automatically held in packing position independent of any end play of the shaft, the said packing ring when assembled being inherently contractable about the shaft to prevent oil leakage.

These objects and the several novel features of the invention are hereinafter more fully described and claimed and the preferred form of construction by which these objects are attained is shown in the accompanying drawings in which—

Fig. 1 is an elevation of a grease retainer as applied to the rear axle of an automobile.

Fig. 2 is a section taken on line 2—2 of Fig. 1.

Fig. 3 is a section taken on line 3—3 of Fig. 2.

Fig. 4 is an elevation of the packing retainer ring.

Fig. 5 is a perspective view of the packing retainer ring as positioned about the packing ring.

As will be understood from Figs. 1, 2 and 3 the grease retainer comprises a cup shaped sheet metal cap 1 provided with a series of slots 2 so that the cap 1 may be slipped over the end 3 of the rear axle housing. To secure the cap 1 on the rear axle housing a clamp 4 is provided which is adjustable by means of the bolt 5 to contract the cap 1 onto the housing 3. A cork ring 6 is positioned in the cap 1 and a casing 7 is pressed into the cap 1 and fits over the cork ring 6, there being a space 8 between the cork ring and the edge of the casing 7. The retainer ring 9 shown in Fig. 4 is made from a coiled spring made of flat steel stock and the ring 9 consists of one coil cut off from the coiled spring. This ring is normally smaller in diameter than the cork ring 6 and in order to position the retainer ring 9 about the cork ring 6 it must be spread apart to increase its diameter and the ends of the ring 9 are brought together in overlapping relation on the cork ring 6 as shown in Fig. 5. The retainer ring 9 and cork ring 6 are assembled on the shaft as shown in Fig. 2 and as the ring 9 is spread apart to fit over the cork ring 6 it constantly tends to contract and thus contracts the cork ring 6 onto the shaft. The ends of the ring 9 tend to spread apart as shown in Fig. 4 and thus one end of the ring 9 engages the inner face of the cap 1 while the opposite end engages the inner face of the casing casing 7 and by the tension of the spring ring 9 which holds these ends in engagement with the corresponding faces, the spring ring 9 and cork ring 6 on which the spring ring 9 is contracted are held stationary with the cap 1 and casing 7 while the shaft 12 rotates within the cork ring 6. A packing 13 is positioned on the flange 14 of the casing 7 and when the cap 1 is positioned on the housing 3 the edge of the housing engages the packing 13 and prevents leakage of oil about the end of the housing. The casing 7 extends into the end of the housing 3 slightly and the tension of the spring ring 9 forcing the cork ring into contact with the shaft 12 also spreads the cork ring so that it engages the cap 1 and the casing 7. By means of the space 8 the cork ring 6 may move in its plane in case there is any play of the shaft 12 and leakage will be prevented by means of the spring ring 9 which holds the cork ring in engagement with the shaft. As the spring 9 holds the cork ring 6 in engagement with the shaft the shaft is packed at all times even though there is considerable end play in the shaft. By this arrangement the oil or grease is prevented from leaking along the surface of the shaft and as the cork ring is expanded by the tension of the spring ring 9 there is no leakage between the faces of the cork ring and the faces of the cap 1 or casing 7 which are contacted by the cork ring, the cork ring being held stationary by the stationary cap 1 and casing 7 and by the tension of the spring 9 which is held stationary by its engagement with the cap 1 and casing 7. Leakage about the end of the housing is also prevented by the packing 13 which is held in contact with the end of the housing.

From the foregoing description it becomes evident that the device is very simple and efficient in operation, will not easily get out of order, is composed of few parts and is of consequent low manufacturing cost and provides a device which accomplishes the objects described.

Having thus fully described my invention, its utility and mode of operation, what I claim and desire to secure by Letters Patent of the United States is—

A grease retainer comprising the combination with a shaft and its bearing and housing therefor, of a cap apertured to receive the shaft and adapted to be bindingly secured over the end of the housing, a casing within the cap forming a chamber between the casing and cap through which the shaft extends, a cork ring positioned within the chamber and adapted to engage the inner faces of the casing and cap, a retainer ring formed from a spiral coil of flat spring metal of slightly more than one turn positioned about the periphery of the cork ring, the retainer ring being normally less in diameter than the outside diameter of the cork ring and tending to contract the cork ring onto the shaft, the spiral coil being compressed longitudinally of its axis when positioned between the cap and the casing causing the ends of the spring to yieldably engage the cap and the casing to resist rotation of the retainer ring and cork ring held thereby.

In testimony whereof I sign this specification.

VICTOR E. NELSON.